US008692821B2

(12) United States Patent
Park

(10) Patent No.: US 8,692,821 B2
(45) Date of Patent: Apr. 8, 2014

(54) ORGANIC LIGHT EMITTING DISPLAY WITH PIXEL AND METHOD OF DRIVING THE SAME

(75) Inventor: Seong-Il Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 326 days.

(21) Appl. No.: 13/013,716

(22) Filed: Jan. 25, 2011

(65) Prior Publication Data

US 2012/0062536 A1 Mar. 15, 2012

(30) Foreign Application Priority Data

Sep. 14, 2010 (KR) ........................ 10-2010-0089954

(51) Int. Cl.
*G06F 3/038* (2013.01)
*G09G 3/30* (2006.01)

(52) U.S. Cl.
USPC ............................................ 345/211; 345/76

(58) Field of Classification Search
None
See application file for complete search history.

(56) References Cited

U.S. PATENT DOCUMENTS

2009/0219232 A1* 9/2009 Choi .............................. 345/76

FOREIGN PATENT DOCUMENTS

KR 10-2005-0038906 4/2005
KR 10-2007-0037147 4/2007

* cited by examiner

*Primary Examiner* — Bipin Shalwala
*Assistant Examiner* — Kwin Xie
(74) *Attorney, Agent, or Firm* — Christie, Parker & Hale, LLP

(57) ABSTRACT

A pixel capable of displaying an image with uniform brightness. The pixel includes an organic light emitting diode (OLED), a first transistor for controlling an amount of current that flows from a first power source to a second power source via the OLED, and a second transistor coupled between a gate electrode of the first transistor and a bias power source, and configured to be turned on when a reset signal is supplied to a reset line, wherein a turn on time of the second transistor is configured to apply the bias power source to the gate electrode of the first transistor for at least 560 μs.

24 Claims, 7 Drawing Sheets

ORGANIC LIGHT EMITTING DISPLAY WITH PIXEL AND METHOD OF DRIVING THE SAME

CROSS-REFERENCE TO RELATED APPLICATION

This application claims priority to and the benefit of Korean Patent Application No. 10-2010-0089954, filed on Sep. 14, 2010, in the Korean Intellectual Property Office, the entire content of which is incorporated herein by reference.

BACKGROUND

1. Field

Embodiments of the present invention relate to an organic light emitting display including pixels, and a method of driving the same.

2. Description of Related Art

Recently, various flat panel displays (FPDs) capable of reducing weight and volume that are disadvantages of cathode ray tubes (CRTs) have been developed. FPDs include liquid crystal displays (LCDs), field emission displays (FEDs), plasma display panels (PDPs), and organic light emitting displays.

Among FPDs, organic light emitting displays display images using organic light emitting diodes (OLEDs) that generate light by re-combination of electrons and holes. Organic light emitting displays have high response speed and are driven with low power consumption.

Organic light emitting displays include a plurality of pixels arranged in a matrix at crossing regions of a plurality of data lines, scan lines, and power source lines. The pixels typically include organic light emitting diodes (OLEDs), and driving transistors for driving current that flows to the OLEDs. The pixels generate light with brightness (e.g., predetermined brightness) while supplying current corresponding to data signals from the driving transistors to the OLEDs.

SUMMARY

Embodiments of the present invention provide an organic light emitting display including pixels capable of displaying an image with uniform brightness, and a method of driving the same.

In order to achieve the foregoing and/or other aspects of embodiments of the present invention, according to one embodiment of the present invention, there is provided a pixel including an organic light emitting diode (OLED), a first transistor for controlling an amount of current that flows from a first power source to a second power source via the OLED, and a second transistor coupled between a gate electrode of the first transistor and a bias power source, and configured to be turned on when a reset signal is supplied to a reset line, wherein a turn on time of the second transistor is configured to apply the bias power source to the gate electrode of the first transistor for at least 560 μs.

The pixel may also include a third transistor coupled between the gate electrode of the first transistor and a data line, and configured to be turned on when a scan signal is supplied to a scan line, a fourth transistor coupled between a second electrode of the first transistor and the OLED, and configured to be turned off when an emission control signal is supplied to an emission control line, and a storage capacitor coupled between the gate electrode of the first transistor and the first power source.

A voltage of the bias power may be lower than a voltage equal to a difference between a threshold voltage of the first transistor and a voltage of the first power source.

A voltage of the bias power source may be higher than a voltage equal to a difference between a threshold voltage of the first transistor and a voltage of the first power source.

The pixel may also include a third transistor coupled between a first electrode of the first transistor and a data line, and configured to be turned on when a scan signal is supplied to an $i^{th}$ (i is a natural number) scan line, a fourth transistor coupled between a second electrode of the first transistor and the OLED, and configured to be turned off when an emission control signal is supplied to an $i^{th}$ emission control line, a fifth transistor coupled between the second electrode of the first transistor and the gate electrode of the first transistor, and configured to be turned on when the scan signal is supplied to the $i^{th}$ scan line, and a sixth transistor coupled between the first electrode of the first transistor and the first power source, and configured to be turned off after the fourth transistor is turned off, and a storage capacitor coupled between the gate electrode of the second transistor and the first power source.

The sixth transistor may be configured to be turned off when an emission control signal is supplied to an $(i+1)^{th}$ emission control line.

The sixth transistor may be configured to be turned on when the third transistor is turned off, and may be configured to be turned off when the third transistor is turned on.

The sixth transistor may be configured to be turned off when an inverted scan signal is supplied to an $i^{th}$ inverted scan line, and may be configured to be turned on otherwise.

A voltage of the bias power source may be lower than a voltage of a data signal supplied to the data line.

A voltage of the bias power source may be equal to or higher than a voltage equal to a difference between a threshold voltage of the first transistor and a voltage of the first power source.

The pixel may also include a seventh transistor configured to be turned on when a scan signal is supplied to an $(i-1)^{th}$ scan line, and coupled between the gate electrode of the first transistor and a second bias power source, wherein a voltage of the second bias power source is lower than a voltage of a data signal supplied from the data line.

According to another embodiment of the present invention, there is provided an organic light emitting display including a scan driver for supplying scan signals to scan lines, and for supplying emission control signals to emission control lines, a data driver for supplying data signals to data lines in synchronization with the scan signals, a reset driver for supplying reset signals to reset lines, and pixels coupled to the scan lines and the data lines, wherein each of the pixels positioned on an $i^{th}$ (i is a natural number) line includes an organic light emitting diode (OLED), a second transistor for controlling an amount of current that flows from a first power source to a second power source via the OLED, a first transistor including a first electrode coupled to a data line of the data lines, and configured to be turned on when a scan signal of the scan signals is supplied to an $i^{th}$ scan line of the scan lines, and a third transistor coupled between a gate electrode of the second transistor and a bias power source, and configured to be turned on when a reset signal of the reset signals is supplied to an $i^{th}$ reset line of the reset lines.

A voltage of the bias power source may be lower than a voltage equal to a difference between a threshold voltage of the second transistor and a voltage of the first power source.

A voltage of the bias power source may be equal to or higher than a voltage equal to a difference between a threshold voltage of the second transistor and a voltage of the first power source.

The scan driver may be configured to supply a scan signal of the scan signals to the $i^{th}$ scan line of the scan lines at least 560 μs after the reset signal of the reset signals is supplied to the $i^{th}$ reset line of the reset lines.

The scan driver may be configured to supply an emission control signal of the emission control signals to an $i^{th}$ emission control line of the emission control lines to overlap the reset signal of the reset signals supplied to the $i^{th}$ reset line of the reset lines and the scan signal of the scan signals supplied to the $i^{th}$ scan line of the scan lines.

The organic light emitting display may also include a storage capacitor coupled between the gate electrode of the second transistor and the first power source, a fourth transistor coupled between the second transistor and the OLED, and configured to be turned off when the emission control signal of the emission control signals is supplied to the $i^{th}$ emission control line of the emission control lines, wherein a second electrode of the first transistor is coupled to the gate electrode of the second transistor.

The organic light emitting display may also include the first transistor further including a second electrode coupled to a first electrode of the second transistor, a fourth transistor coupled between the second electrode of the second transistor and the OLED, and configured to be turned off when the emission control signal of the emission control signals is supplied to the $i^{th}$ emission control line of the emission control lines, a fifth transistor coupled between a second electrode of the second transistor and the gate electrode of the second transistor, and configured to be turned on when the scan signal of the scan signals is supplied to the $i^{th}$ scan line of the scan lines, a sixth transistor coupled between the first electrode of the second transistor and the first power source, and configured to be turned off when the fourth transistor is turned off, a storage capacitor coupled between the gate electrode of the second transistor and the first power source.

The sixth transistor may be configured to be turned off when an $(i+1)^{th}$ emission control signal of the emission control signals is supplied to an $(i+1)^{th}$ emission control line of the emission control lines.

The sixth transistor may be configured to be turned on when the first transistor is turned off, and to be turned off when the first transistor is turned on.

A voltage of the bias power source may be lower than a voltage of a data signal of the data signals supplied to the data line of the data lines.

A voltage of the bias power source may be equal to or higher than a voltage equal to a difference between a threshold voltage of the second transistor and a voltage of the first power source.

The organic light emitting display may also include a seventh transistor configured to be turned on when an $(i-1)^{th}$ scan signal of the scan signals is supplied to an $(i-1)^{th}$ scan line of the scan lines, and coupled between the gate electrode of the second transistor and a second bias power source having a voltage that is lower than a voltage of a data signal of the data signals supplied from the data line of the data lines.

A width of the reset signal of the reset signals may be equal to or larger than a width of the scan signal of the scan signals.

According to yet another embodiment of the present invention, there is provided a method of driving an organic light emitting display including applying a bias voltage to a gate electrode of a driving transistor for at least 560 μs, supplying a data signal to charge a voltage corresponding to the data signal in a storage capacitor, and controlling an amount of current corresponding to the charged voltage and supplied from the driving transistor to an OLED.

The bias voltage may be an on bias voltage.

The bias voltage may be an off bias voltage.

In the organic light emitting display including pixels according to embodiments of the present invention, and the method of driving the same, a bias voltage is applied to the driving transistors included in the pixels for an amount of time (e.g., a predetermined time). As described above, when the bias voltage is applied to the driving transistors, an optical response characteristic of brightness is improved so that motion blur and ghost image (e.g., ghosting) may be reduced or minimized when moving pictures (e.g., moving images) are displayed.

BRIEF DESCRIPTION OF THE DRAWINGS

The accompanying drawings, together with the specification, show exemplary embodiments of the present invention, and, together with the description, serve to explain principles and/or aspects of embodiments of the present invention.

DETAILED DESCRIPTION

Figure 1:
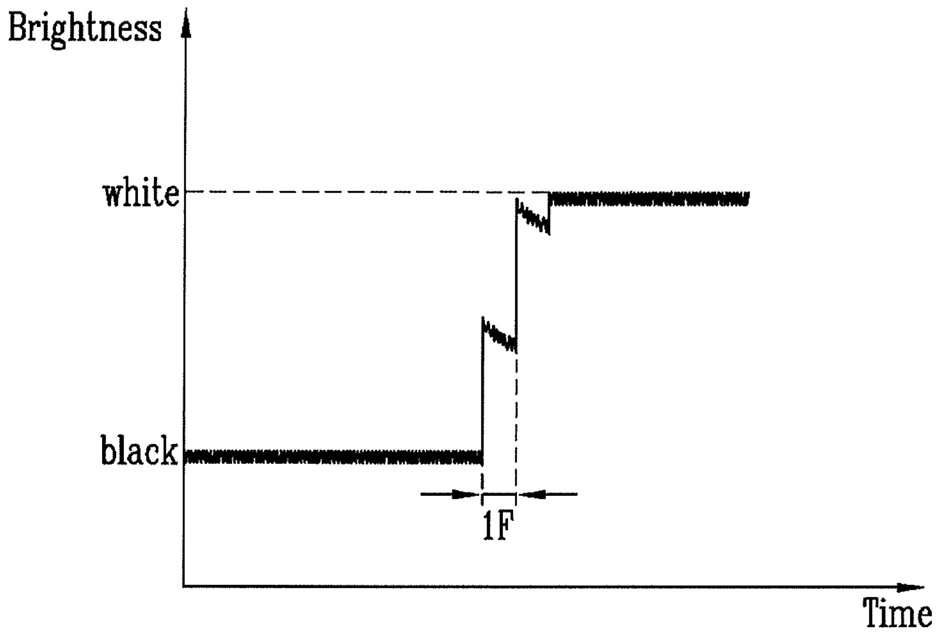
FIG. 1 is a graph showing brightness when white gray levels are displayed after black gray levels.

Referring to FIG. 1, in a conventional pixel, when white gray scales (e.g., white gray levels) are displayed following the display of black gray scales (e.g., black gray levels), light with brightness lower than the desired brightness is generated for about a two-frame period. In this case, an image with desired brightness corresponding to the gray levels is not displayed by the pixels so that uniformity of brightness may deteriorate and so that picture quality of moving pictures (e.g., moving images) may deteriorate.

In an organic light emitting display, deterioration of a response characteristic is caused by characteristics of driving transistors included in the pixels. That is, threshold voltages of the driving transistors are shifted to correspond to voltages applied to the driving transistors in a previous frame period, and light with desired brightness is not generated in a current frame due to the shifted threshold voltages. According to embodiments of the present invention, a method of displaying an image with desired brightness regardless of the characteristics of the driving transistors is provided.

Hereinafter, certain exemplary embodiments according to the present invention will be described with reference to the accompanying drawings. Here, when a first element is described as being coupled to a second element, the first element may be directly coupled to the second element, or may be indirectly coupled to the second element via one or more other elements. Further, some of the elements that are not essential to a complete understanding of embodiments of the present invention are omitted for clarity. Also, like reference numerals refer to like elements throughout.

Embodiments by which those skilled in the art may easily perform the present invention will be described with reference to FIGS. 2 to 10.

Figure 2:
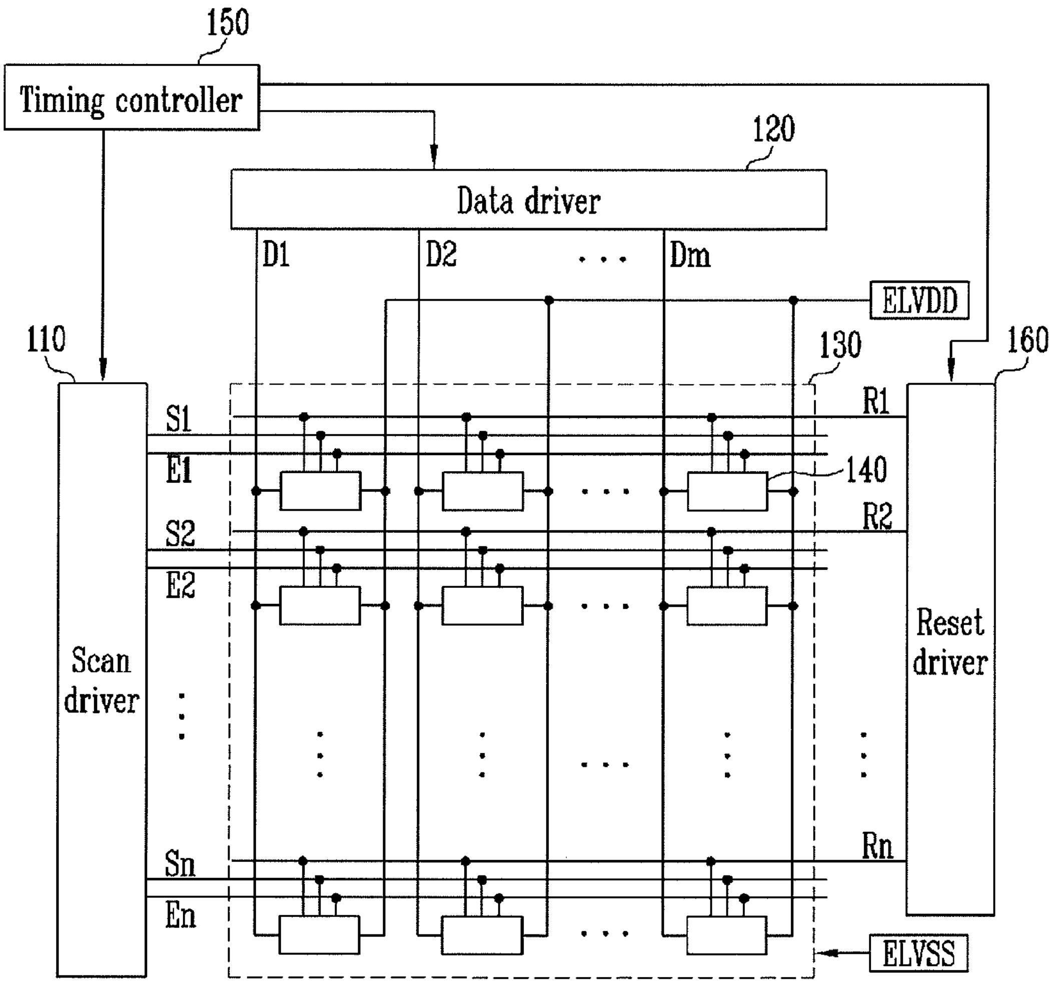
FIG. 2 is a view showing an organic light emitting display according to an embodiment of the present invention.

FIG. 2 is a view showing an organic light emitting display according to an embodiment of the present invention.

Referring to FIG. 2, the organic light emitting display according to the present embodiment includes a display unit 130 including pixels 140 positioned at crossing regions of scan lines S1 to Sn, emission control lines E1 to En, reset lines R1 to Rn, and data lines D1 to Dm, a scan driver 110 for driving the scan lines S1 to Sn and emission control lines E1 to En, a reset driver 160 for driving the reset lines R1 to Rn, a data driver 120 for driving the data lines D1 to Dm, and a timing controller 150 for controlling the scan driver 110, the data driver 120, and the reset driver 160.

The scan driver 110 supplies (e.g., sequentially supplies) scan signals to the scan lines S1 to Sn, and supplies (e.g., sequentially supplies) emission control signals to the emission control lines E1 to En. When the scan signals are sequentially supplied to the scan lines S1 to Sn, the pixels 140 are sequentially selected in units of horizontal lines in a period of one frame (e.g., one frame period). When the emission control signals are sequentially supplied to the emission control lines E1 to En, the pixels 140 are set in a non-emission state in units of horizontal lines (e.g., line by line). Here, an emission control signal supplied to an $i^{th}$ (i is a natural number) emission control line Ei is supplied to overlap (e.g., temporally and partially overlap) a scan signal supplied to an $i^{th}$ scan line Si.

For example, the pixels 140 are set in an emission state in a period where the emission control signals are not supplied in a period of one frame, and are set in the non-emission state in a period where the emission control signals are supplied. Here, the non-emission state is a period of realizing (e.g., displaying) black gray levels. In general, when black is displayed in a partial period in one frame period, motion blur is reduced so that picture quality is improved. The width of the emission control signals supplied to the emission control lines E1 to En may be experimentally determined considering the size and resolution of a panel.

The data driver 120 supplies the data signals to the data lines D1 to Dm in synchronization with the scan signals supplied to the scan lines S1 to Sn. The data signals supplied to the data lines D1 to Dm are supplied to the pixels 140 selected by the scan signals.

The reset driver 160 sequentially supplies reset signals to the reset lines R1 to Rn. Here, the reset signals are supplied to the reset lines R1 to Rn in a period where the pixels 140 are set in the non-emission state. Therefore, a reset signal supplied to an $i^{th}$ reset line Ri overlaps (e.g., temporally and partially overlaps) the emission control signal supplied to the $i^{th}$ emission control line Ei.

The timing controller 150 controls the scan driver 110, the data driver 120, and the reset driver 160.

The display unit 130 includes the pixels 140 positioned at crossing regions of the scan lines S1 to Sn and the data lines D1 to Dm. The pixels 140 receive a first power source ELVDD and a second power source ELVSS, which is set to have a lower voltage than that of the first power source ELVDD. The pixels 140 that receive the first power source ELVDD and the second power source ELVSS control the amount of current that flows from the first power source ELVDD to the second power source ELVSS via the OLEDs in accordance with the data signals, and generate light with brightness (e.g., with predetermined brightness).

Figure 3:
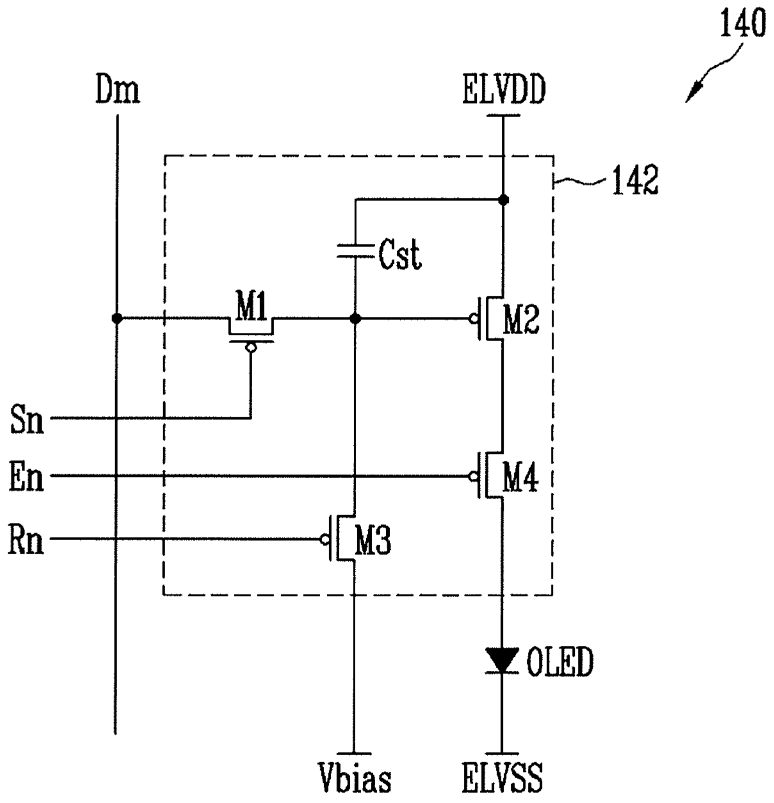
FIG. 3 is a view showing a pixel according to a first embodiment of the present invention.

FIG. 3 is a view showing a pixel circuit according to a first embodiment of the present invention.

Referring to FIG. 3, the pixel 140 according to the first embodiment of the present invention includes an OLED and a pixel circuit 142 for controlling an amount of current supplied to the OLED.

An anode electrode of the OLED is coupled to the pixel circuit 142, and a cathode electrode of the OLED is coupled to the second power source ELVSS. The OLED generates light with brightness (e.g., with predetermined brightness) corresponding to current supplied from the pixel circuit 142.

The pixel circuit 142 charges a voltage corresponding to a data signal, and controls an amount of current supplied to the OLED in accordance with the charged voltage. The pixel circuit 142 applies a bias voltage to a driving transistor M2 when a reset signal is supplied to the reset line Rn to uniformly maintain the characteristics of the driving transistor M2. Therefore, the pixel circuit 142 includes four transistors M1 to M4 and a storage capacitor Cst.

A first electrode of the first transistor M1 is coupled to the data line Dm, and a second electrode of the first transistor M1 is coupled to a gate electrode of the second transistor M2. A gate electrode of the first transistor M1 is coupled to the scan line Sn. The first transistor M1 is turned on when the scan signal is supplied to the scan line Sn to electrically couple the data line Dm to the gate electrode of the second transistor M2.

A first electrode of the second transistor M2 (driving transistor) is coupled to the first power source ELVDD, and a second electrode of the second transistor M2 is coupled to a first electrode of the fourth transistor M4. The gate electrode of the second transistor M2 is coupled to the second electrode of the first transistor M1. The second transistor M2 controls an amount of current supplied from the first power source ELVDD to the second power source ELVSS via the OLED and corresponding to a voltage applied to the gate electrode thereof.

A first electrode of the third transistor M3 is coupled to the gate electrode of the second transistor M2, and a second electrode of the third transistor M3 is coupled to a bias power source Vbias. A gate electrode of the third transistor M3 is coupled to the reset line Rn. The third transistor M3 is turned on when the reset signal is supplied to the reset line Rn to supply the bias power source Vbias to the gate electrode of the second transistor M2. The voltage of the bias power source Vbias is set so that an on bias voltage or an off bias voltage is applied to the second transistor M2. Detailed description of the above will be described later.

The first electrode of the fourth transistor M4 is coupled to the second electrode of the second transistor M2, and a second electrode of the fourth transistor M4 is coupled to the anode electrode of the OLED. A gate electrode of the fourth transistor M4 is coupled to the emission control line En. The fourth transistor M4 is turned off when the emission control signal is supplied to the emission control line En, and is turned on otherwise.

The storage capacitor Cst is coupled between the gate electrode of the second transistor M2 and the first power source ELVDD. The storage capacitor Cst charges a voltage (e.g., a predetermined voltage) corresponding to a data signal.

Figure 4:
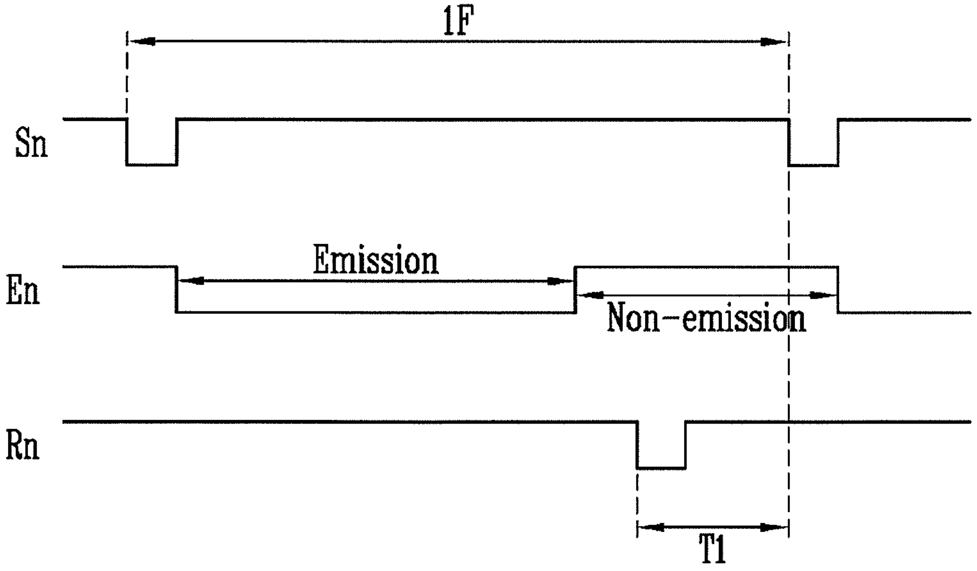
FIG. 4 is a waveform chart showing a method of driving the pixel of the embodiment shown in FIG. 3.

FIG. 4 is a waveform chart showing a method of driving pixels of the embodiment shown in FIG. 3.

Referring to FIG. 4, the scan signal is supplied to the scan line Sn, and the emission control signal is supplied to the emission control line En.

When the scan signal is supplied to the scan line Sn, the first transistor M1 is turned on. When the first transistor M1 is turned on, the data signal from the data line Dm is supplied to the gate electrode of the second transistor M2. At this time, the storage capacitor Cst charges the voltage corresponding to the data signal.

When the emission control signal is supplied to the emission control line En, the fourth transistor M4 is turned off. When the fourth transistor M4 is turned off, electric coupling between the OLED and the second transistor M2 is blocked (e.g., the OLED and the second transistor M2 are electrically decoupled). Therefore, in a period where the data signal is charged in the storage capacitor Cst, unnecessary light is not generated by the OLED.

Then, the supply of the emission control signal to the emission control line En is stopped so that the fourth transistor M4 is turned on. When the fourth transistor M4 is turned on, the OLED and the second transistor M2 are electrically coupled to each other. At this time, the second transistor M2 supplies current (e.g., predetermined current) to the OLED corresponding to the voltage charged in the storage capacitor Cst so that the OLED is set in an emission state.

After the pixel 140 is set in the emission state for a period (e.g., a predetermined period), the emission control signal is supplied to the emission control line En so that the pixel 140 is set in a non-emission state. After the pixel 140 is set in the non-emission state, the reset signal is supplied to the reset line Rn.

When the reset signal is supplied to the reset line Rn, the voltage of the bias power source Vbias is supplied to the gate electrode of the second transistor M2 so that the second transistor M2 is set in an on bias state or an off bias state.

For example, when the voltage of the bias power source Vbias is set to be lower than the voltage obtained by subtracting the threshold voltage of the second transistor M2 from the voltage of the first power source ELVDD (e.g., a difference between a threshold voltage of the second transistor M2 and a voltage of the first power source ELVDD), the on bias voltage is applied to the second transistor M2. When the on bias voltage is applied to the second transistor M2, a characteristic curve (or a threshold voltage) of the second transistor M2 is initialized to a uniform state. That is, the second transistor M2 included in each of the pixels 140 is initialized to a state of displaying specific gray levels, for example, the white gray levels. In this case, when black gray levels or other gray levels are realized by a subsequent frame, light with the same brightness is generated by the pixels 140 so that an image with uniform brightness may be displayed. In particular, when a moving picture (e.g., moving images) is displayed, an optical response characteristic of brightness is improved to reduce or minimize motion blur and a ghost image (e.g., ghosting).

When the on bias is applied according to embodiments of the present invention, the voltage of the bias power source Vbias may be set to be lower than a voltage of the data signal. In this case, since all of the pixels 140 are initialized to a state of displaying white, stability of driving may be secured.

Additionally, when the voltage of the bias power source Vbias is set as a voltage that is the same as or higher than the voltage obtained by subtracting the threshold voltage of the second transistor M2 from the voltage of the first power source ELVDD, the off bias voltage is applied to the second transistor M2. When the off bias voltage is applied to the second transistor M2, the characteristic curve (or the threshold voltage) of the second transistor M2 is initialized to a uniform state. That is, the second transistor M2 included in each of the pixels 140 is initialized to a state of displaying black gray levels. In this case, when white gray levels are realized in the next frame, light with the same brightness is generated by the pixels 140 so that an image with uniform brightness may be displayed.

The reset signal supplied to the reset line Rn according to embodiments of the present invention is set so that the on or off bias voltage is applied to the second transistor M2 for a time no less than 560 us (560 μs, 560 microseconds, or 0.56 ms). That is, a period T1, which is from a point in time the reset signal is supplied to the reset line Rn to a point in time the scan signal is supplied to the scan line Sn, is set to be no less than 560 μs.

Figure 5:
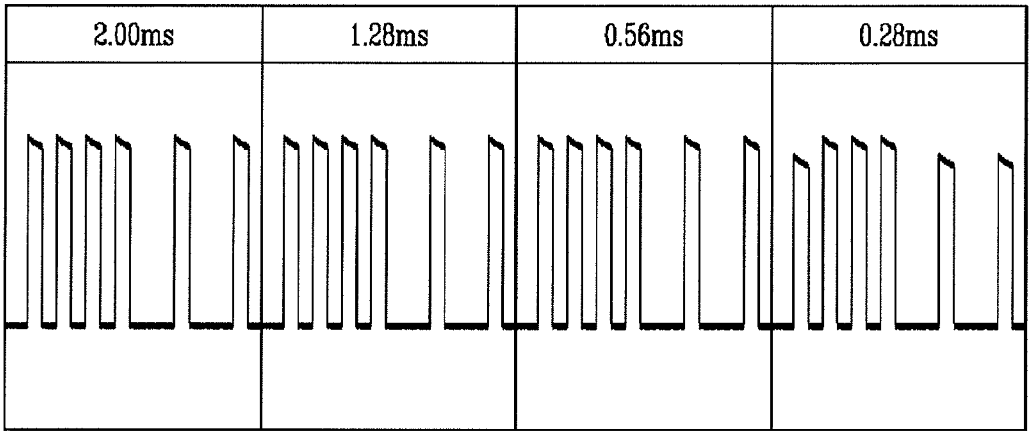
FIG. 5 is a graph showing brightness corresponding to the length of time the bias voltage is applied after the point in time when the reset signal of FIG. 4 is supplied.

FIG. 5 is a graph showing brightness corresponding to the point in time when the reset signal of FIG. 4 is supplied (e.g., corresponding to values of the period T1 being equal to 2.0 ms, 1.28 ms, 0.56 ms, and 0.28 ms). The graph of FIG. 5 is measured after setting the voltage of the bias power source Vbias so that the on bias voltage is applied.

Referring to FIG. 5, when the bias voltage is applied to the second transistor M2 for a time less than 560 μs (e.g., 0.28 ms), brightness between frames is non-uniform and corresponds to the display time of the black gray levels. That is, brightness components are set to vary between when the white gray levels are displayed after the black gray levels are displayed for two or more frames, and when the white gray levels are displayed after the black gray levels are displayed for one frame. However, when the bias voltage is applied to the second transistor M2 for a time no less than 560 μs, brightness is set to be uniform regardless of the display time of the black gray levels (e.g., the number of frames for which the black gray levels are displayed). Therefore, according to embodiments of the present invention, the scan signal is set to be supplied to the scan line Sn at least 560 μs after the reset signal is supplied to the reset line Rn.

Additionally, according to embodiments of the present invention, the width of the reset signal may be set to vary (e.g., may be varied). For example, in a period where the reset signal is supplied so that the third transistor M3 is turned on, the bias voltage of the bias power source Vbias supplied to the gate electrode of the second transistor M2 is stored in the storage capacitor Cst so that the bias voltage may be continuously applied to the second transistor M2 even though the third transistor M3 is turned off. According to embodiments of the present invention, for stability, the width of the reset signal may be set to be equal to or larger than the width of the scan signal.

As described above, according to embodiments of the present invention, the structure of the pixel 140 may vary to include the third transistor M3.

Figure 6:
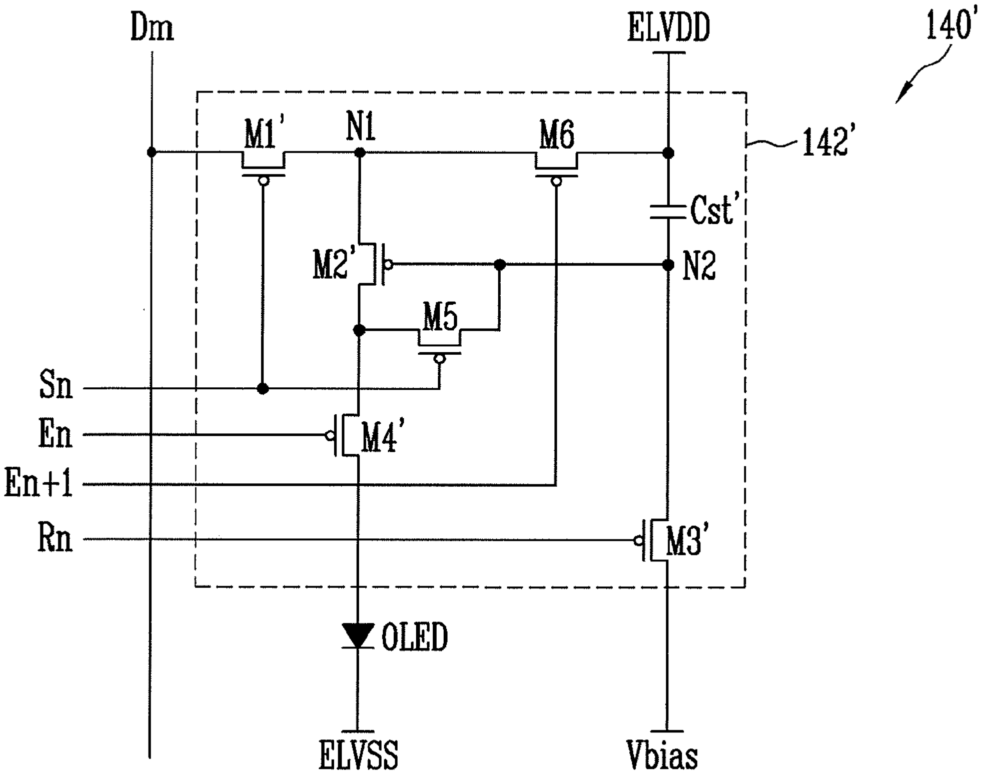
FIG. 6 is a view showing a pixel according to a second embodiment of the present invention.

FIG. 6 is a view showing a pixel according to a second embodiment of the present invention.

Referring to FIG. 6, a pixel 140' according to the second embodiment of the present invention includes an OLED and a pixel circuit 142' for controlling the amount of current supplied to the OLED. The pixel 140', for example, may be used to replace the pixel 140 of FIG. 2 and FIG. 3.

An anode electrode of the OLED is coupled to the pixel circuit 142' and a cathode electrode of the OLED is coupled to the second power source ELVSS. The OLED generates light with brightness (e.g., predetermined brightness) corresponding to a current supplied from the pixel circuit 142'.

The pixel circuit 142' charges a voltage corresponding to a data signal, and controls the amount of current supplied to the OLED in accordance with the charged voltage. The pixel circuit 142' also applies a bias voltage to a driving transistor MT when a reset signal is supplied to the reset line Rn to maintain the characteristic of the driving transistor M2' to be uniform. Therefore, the pixel circuit 142' includes six transistors M1', M2', M3', M4', M5, and M6, and the storage capacitor Cst'.

A first electrode of a first transistor M1' is coupled to the data line Dm and a second electrode of the first transistor M1' is coupled to a first node N1. A gate electrode of the first transistor M1' is coupled to the scan line Sn. The first transistor M1' is turned on when a scan signal is supplied to the scan line Sn to electrically couple the data line Dm to the first node N1.

A first electrode of the second transistor M2' is coupled to the first node N1 and a second electrode of the second transistor M2' is coupled to a first electrode of the fourth transistor M4'. A gate electrode of the second transistor M2' is coupled to a second node N2. The second transistor M2' controls an amount of current supplied from the first power source ELVDD to the second power source ELVSS via the OLED to correspond to the voltage applied to the second node N2.

A first electrode of the third transistor M3' is coupled to the second node N2, and a second electrode of the third transistor M3' is coupled to a bias power source Vbias. A gate electrode of the third transistor M3' is coupled to the reset line Rn. The third transistor M3' is turned on when a reset signal is supplied to the reset line Rn to supply the voltage of the bias power source Vbias to the gate electrode of the second transistor M2'. Here, the bias power source Vbias is set to be a lower voltage than that of the data signal. In this case, the bias power source Vbias supplied to the third transistor M3' initializes the voltage of the second node N2, and applies the on bias voltage to the second transistor M2'.

The first electrode of the fourth transistor M4' is coupled to the second electrode of the second transistor M2', and a second electrode of the fourth transistor M4' is coupled to the anode electrode of the OLED. A gate electrode of the fourth transistor M4' is coupled to the $n^{th}$ emission control line En. The fourth transistor M4' is turned off when an emission control signal is supplied to the $n^{th}$ emission control line En, and is turned on otherwise.

A first electrode of the fifth transistor M5 is coupled to the second electrode of the second transistor M2', and a second electrode of the fifth transistor M5 is coupled to the second node N2. A gate electrode of the fifth transistor M5 is coupled to the scan line Sn. The fifth transistor M5 is turned on when the scan signal is supplied to the scan line Sn to couple the second transistor M2' in the form of a diode.

A first electrode of the sixth transistor M6 is coupled to the first power source ELVDD, and a second electrode of the sixth transistor M6 is coupled to the first node N1. A gate electrode of the sixth transistor M6 is coupled to the $(n+1)^{th}$ emission control line En+1. The sixth transistor M6 is turned off when an emission control signal is supplied to the $(n+1)^{th}$ emission control line En+1, and is turned on otherwise.

The storage capacitor Cst' is coupled between the second node N2 and the first power source ELVDD. The storage capacitor Cst' charges a voltage (e.g., a predetermined voltage) corresponding to the data signal.

Figure 7:
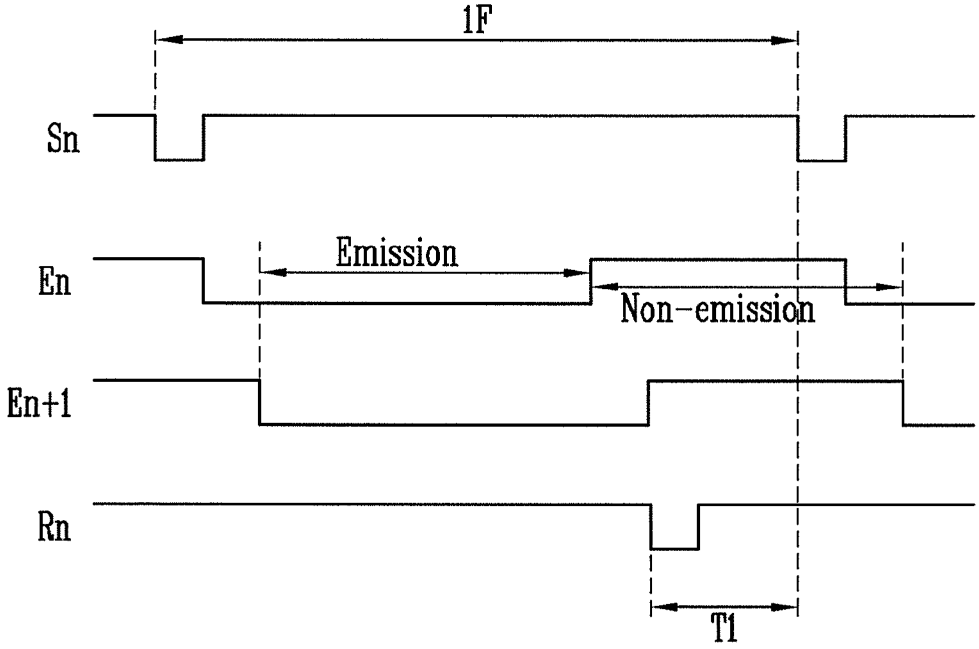
FIG. 7 is a waveform chart showing a method of driving the pixel of the embodiment shown in FIG. 6.

FIG. 7 is a waveform chart showing a method of driving the pixel of the embodiment shown in FIG. 6.

Referring to FIG. 7, the scan signal is supplied to the scan line Sn, and then the emission control signal is supplied to the $n^{th}$ emission control line En. When the scan signal is supplied to the scan line Sn, the first transistor M1' and the fifth transistor M5 are turned on. When the first transistor M1' is turned on, the data signal from the data line Dm is supplied to the first node N1.

When the fifth transistor M5 is turned on, the second transistor M2' is coupled in the form of a diode (e.g., the second transistor M2' is diode coupled). At this time, since the voltage of the second node N2 is set as the bias voltage of the bias power source Vbias, the second transistor M2' is turned on. When the second transistor M2' is turned on, a voltage obtained by subtracting a threshold voltage of the second transistor M2' from the data signal is applied to the second node N2. At this time, the storage capacitor Cst' charges the voltage corresponding to the data signal and the threshold voltage of the second transistor M2'.

When the emission control signal is supplied to the $n^{th}$ emission control line En, the fourth transistor M4' is turned off. When the fourth transistor M4' is turned off, electric coupling between the OLED and the second transistor M2' is blocked (e.g., the OLED and the second transistor M2' are electrically decoupled). Therefore, while the data signal is charged in the storage capacitor Cst', unnecessary light is not generated by the OLED.

Then, supply of the emission control signal to the $n^{th}$ emission control line En and the $(n+1)^{th}$ emission control line En+1 is sequentially stopped so that the fourth transistor M4' and the sixth transistor M6 are turned on. When the fourth transistor M4' and the sixth transistor M6 are turned on, the first power source ELVDD, the second transistor M2', and the OLED are electrically coupled to each other. At this time, the second transistor M2' supplies a current (e.g., predetermined current) to the OLED corresponding to the voltage charged in the storage capacitor Cst' so that the OLED is set in an emission state.

After the pixel 140' is set in the emission state for a period (e.g., a predetermined period), the emission control signal is supplied to the $n^{th}$ emission control line En so that the fourth transistor M4' is turned off. Then, the emission control signal is supplied to the $(n+1)^{th}$ emission control line En so that the sixth transistor M6 is turned off.

Then, the reset signal is supplied to the reset line Rn so that the third transistor M3' is turned on. When the third transistor M3' is turned on, the voltage of the bias power source Vbias is supplied to the second node N2. At this time, the second transistor M2' receives the on bias voltage.

According to the present embodiment, the sixth transistor M6 is set in a turn off state after the fourth transistor M4' is turned off. In this case, the voltage of the first node N1 maintains the voltage of the first power source ELVDD by parasitic capacitance (e.g., the parasitic capacitance of the second transistor M2', the first transistor M1', and the sixth transistor M6) so that the second transistor M2' may stably receive a forward bias voltage.

When the on bias voltage is supplied to the second transistor M2', the characteristic curve (or the threshold voltage) of the second transistor M2' is initialized to a uniform state so that an image with uniform brightness may be displayed. Since the width of the reset signal and the point in time at which the reset signal is supplied are the same as those of FIGS. 3 and 4, detailed description thereof will be omitted.

In FIG. 6, it is shown that the sixth transistor M6 is coupled to the $(n+1)^{th}$ emission control line En+1. However, the present invention is not limited to the above. For example, the sixth transistor M6 may receive driving waveforms in various types to be alternately turned on with the first transistor M1'.

Figure 8:
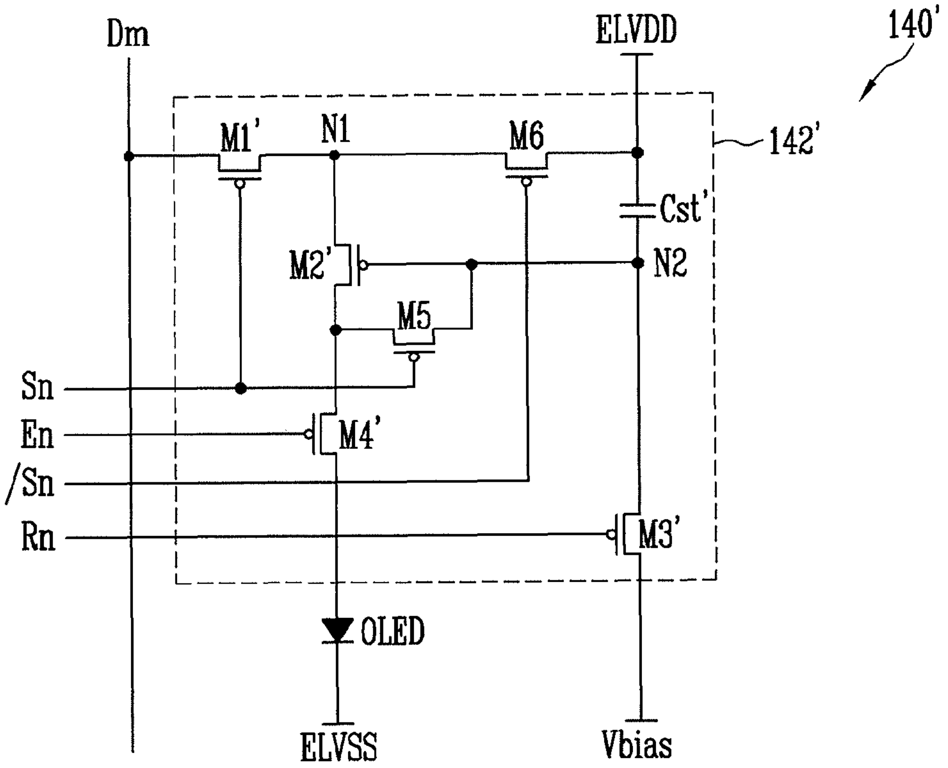
FIG. 8 is a view showing a pixel according to a third embodiment of the present invention.
Figure 9:
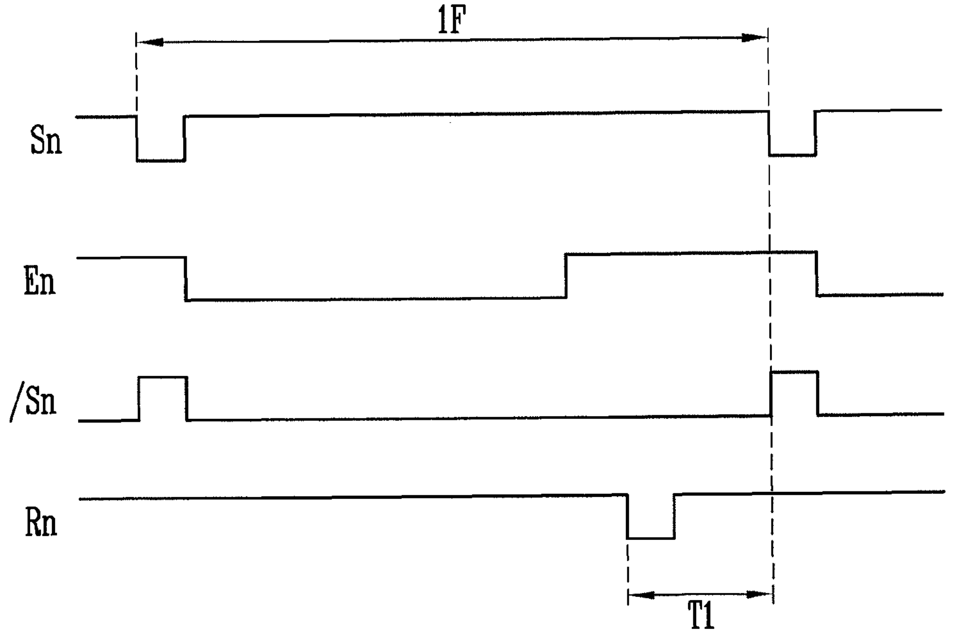
FIG. 9 is a waveform chart showing a method of driving the pixel of the embodiment shown in FIG. 8.

For example, as shown in FIG. 8, the sixth transistor M6 may be coupled to an inverted scan line /Sn. The inverted scan line /Sn receives an inverted scan signal. As shown in FIG. 9, the inverted scan signal supplied to the $n^{th}$ inverted scan line /Sn is supplied to overlap (e.g., temporally and partially overlap) the scan signal supplied to the $n^{th}$ scan line Sn.

When the inverted scan signal is supplied to the $n^{th}$ inverted scan line /Sn, the sixth transistor M6 is turned off, and is turned on otherwise. That is, the sixth transistor M6 is set in the turn off state when the data signal is supplied to the first node N1, and is set in a turn on state otherwise. When the sixth transistor M6 is set in the turn on state, in a period where the voltage of the bias power source Vbias is supplied to the second node N2, the on bias voltage may be stably applied to the second transistor M2'. Since the other operation processes are the same as those described with respect to FIG. 6, detailed description thereof will be omitted.

Figure 10:
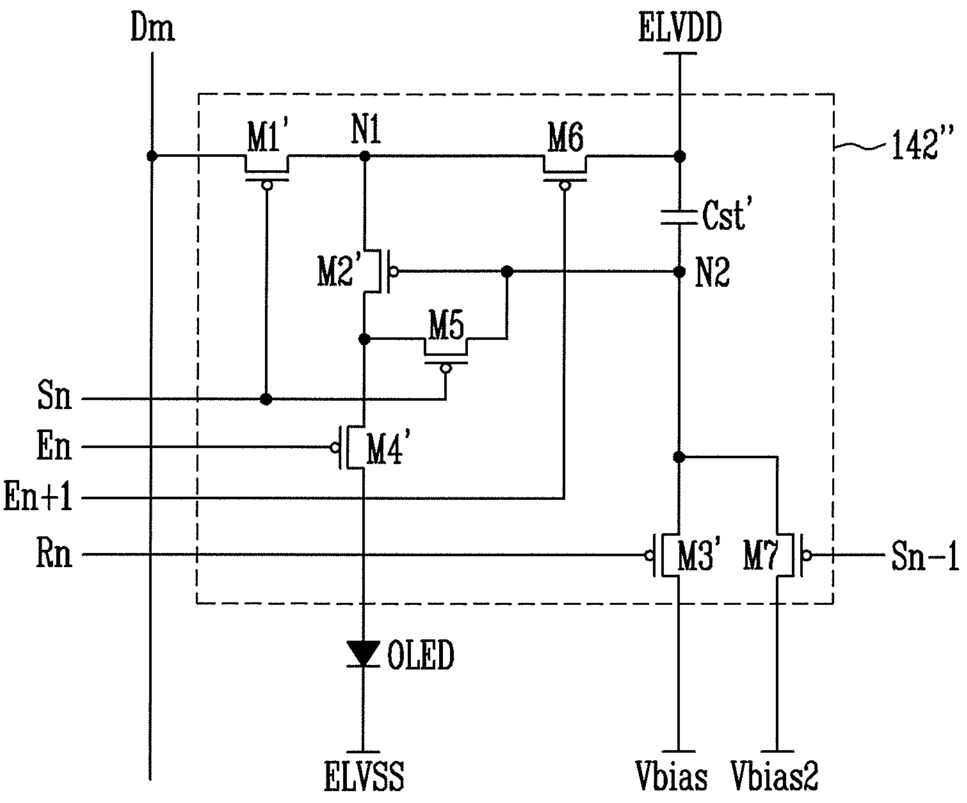
FIG. 10 is a view showing a pixel according to a fourth embodiment of the present invention.

FIG. 10 is a view showing a pixel according to a fourth embodiment of the present invention. When FIG. 10 is described, the same elements as those of FIG. 6 are denoted by the same reference numerals, and detailed description thereof will be omitted.

Referring to FIG. 10, a pixel 140" according to a fourth embodiment of the present invention includes an OLED and a pixel circuit 142" for controlling the amount of current supplied to the OLED. The pixel 140", for example, may be used to replace the pixel 140 of FIG. 2 and FIG. 3 or the pixel 140' of FIG. 6 and FIG. 8.

The pixel circuit 142" includes a third transistor M3' coupled between a second node N2 and a bias power source Vbias, and a seventh transistor M7 coupled between the second node N2 and a second bias power source Vbias2.

The seventh transistor M7 is turned on when a scan signal is supplied to an $(n-1)^{th}$ scan line Sn−1 to supply a voltage of the second bias power source Vbias2 to the second node N2. Here, the second bias power source Vbias2 is set to have a voltage that is lower than the voltage of the data signal. That is, when the seventh transistor M7 is turned on, the second node N2 is initialized to a voltage that is lower than a voltage of the data signal.

The third transistor M3' is turned on when the reset signal is supplied to the reset line Rn to supply the voltage of the bias power source Vbias to the second node N2. Here, the voltage of the bias power source Vbias is set so that the off bias is applied to the second transistor M2'. That is, other than that the voltage of the bias power source Vbias is set in order to apply the off bias voltage to the second transistor M2' and that the second bias voltage and the second bias power source Vbias for initializing the second node N2 are additionally supplied, the remaining structure and the driving method of the pixel 140" shown in FIG. 10 are substantially the same as those of the pixel 140' shown in FIG. 6. Therefore, detailed description thereof will be omitted.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel comprising:

an organic light emitting diode (OLED);

a first transistor for controlling an amount of current that flows from a first power source to a second power source via the OLED;

a second transistor coupled between a gate electrode of the first transistor and a bias power source, and configured to be turned on when a reset signal is supplied to a reset line; and a sixth transistor coupled between a first electrode of the first transistor and the first power source, and configured to be turned from on to off at a time during a non-emission period of the pixel, wherein a turn on time of the second transistor is configured to apply the bias power source to the gate electrode of the first transistor for at least 560 μs, and wherein the current, which flows from the first power source to the second power source via the OLED, flows through the first transistor and flows through the sixth transistor.

2. The pixel as claimed in claim 1, further comprising:

a third transistor coupled between the first electrode of the first transistor and a data line, and configured to be turned on when a scan signal is supplied to a scan line;

a fourth transistor coupled between a second electrode of the first transistor and the OLED, and configured to be turned off when an emission control signal is supplied to an emission control line; and a storage capacitor coupled between the gate electrode of the first transistor and the first power source.

3. The pixel as claimed in claim 1, wherein a voltage of the bias power is lower than a voltage equal to a difference between a threshold voltage of the first transistor and a voltage of the first power source.

4. The pixel as claimed in claim 1, wherein a voltage of the bias power source is higher than a voltage equal to a difference between a threshold voltage of the first transistor and a voltage of the first power source.

5. A pixel comprising:

an organic light emitting diode (OLED);

a first transistor for controlling an amount of current that flows from a first power source to a second power source via the OLED;

a second transistor coupled between a gate electrode of the first transistor and a bias power source, and configured to be turned on when a reset signal is supplied to a reset line;

a third transistor coupled between first electrode of the first transistor and a data line, and configured to be turned on when a scan signal is supplied to an $i^{th}$ (i is a natural number) scan line;

a fourth transistor coupled between a second electrode of the first transistor and the OLED, and configured to be turned off when an emission control signal is supplied to an $i^{th}$ emission control line;

a fifth transistor coupled between the second electrode of the first transistor and the gate electrode of the first transistor, and configured to be turned on when the scan signal is supplied to the $i^{th}$ scan line;

a sixth transistor coupled between the first electrode of the first transistor and the first power source, and configured to be turned from on to off at a time during a non-emission period of the pixel; and a storage capacitor coupled between the gate electrode of the second transistor and the first power source, wherein the sixth transistor is configured to be turned off after the fourth transistor is turned from on to off at a point in time when the fourth transistor is turned off, and wherein a turn on time of the second transistor is configured to apply the bias power source to the gate electrode of the first transistor for at least 560 μs.

6. The pixel as claimed in claim 5, wherein the sixth transistor is configured to be turned off when an emission control signal is supplied to an $(i+1)^{th}$ emission control line.

7. The pixel as claimed in claim 5, wherein the sixth transistor is configured to be turned on when the third transistor is turned off, and is configured to be turned off when the third transistor is turned on.

8. The pixel as claimed in claim 7, wherein the sixth transistor is configured to be turned off when an inverted scan signal is supplied to an $i^{th}$ inverted scan line, and is configured to be turned on otherwise.

9. The pixel as claimed in claim 5, wherein a voltage of the bias power source is lower than a voltage of a data signal supplied to the data line.

10. The pixel as claimed in claim 5, wherein a voltage of the bias power source is equal to or higher than a voltage equal to a difference between a threshold voltage of the first transistor and a voltage of the first power source.

11. The pixel as claimed in claim 10, further comprising a seventh transistor configured to be turned on when a scan signal is supplied to an $(i-1)^{th}$ scan line, and coupled between the gate electrode of the first transistor and a second bias power source, wherein a voltage of the second bias power source is lower than a voltage of a data signal supplied from the data line.

12. An organic light emitting display comprising:

a scan driver for supplying scan signals to scan lines, and for supplying emission control signals to emission control lines;

a data driver for supplying data signals to data lines in synchronization with the scan signals;

a reset driver for supplying reset signals to reset lines; and pixels coupled to the scan lines and the data lines, wherein each of the pixels positioned on an $i^{th}$ (i is a natural number) line comprises:

an organic light emitting diode (OLED);

a second transistor for controlling an amount of current that flows from a first power source to a second power source via the OLED;

a first transistor comprising a first electrode coupled to a data line of the data lines, and configured to be turned on when a scan signal of the scan signals is supplied to an $i^{th}$ scan line of the scan lines;

a third transistor coupled between a gate electrode of the second transistor and a bias power source, and configured to be turned on when a reset signal of the reset signals is supplied to an $i^{th}$ reset line of the reset lines; and a sixth transistor coupled between the first electrode of the second transistor and the first power source, and configured to be turned from on to off at a time during a non-emission period of an $i^{th}$ pixel of the pixels, wherein the current, which flows from the first power source to the second power source via the OLED, flows through the second transistor and flows through the sixth transistor.

13. The organic light emitting display as claimed in claim 12, wherein a voltage of the bias power source is lower than a voltage equal to a difference between a threshold voltage of the second transistor and a voltage of the first power source.

14. The organic light emitting display as claimed in claim 12, wherein a voltage of the bias power source is equal to or higher than a voltage equal to a difference between a threshold voltage of the second transistor and a voltage of the first power source.

15. The organic light emitting display as claimed in claim 12, wherein the scan driver is configured to supply the scan signal of the scan signals to the $i^{th}$ scan line of the scan lines at least 560 μs after the reset signal of the reset signals is supplied to the $i^{th}$ reset line of the reset lines.

16. The organic light emitting display as claimed in claim 15, wherein the scan driver is configured to supply an emission control signal of the emission control signals to an $i^{th}$ emission control line of the emission control lines to overlap the reset signal of the reset signals supplied to the $i^{th}$ reset line of the reset lines and the scan signal of the scan signals supplied to the $i^{th}$ scan line of the scan lines.

17. The organic light emitting display as claimed in claim 16, further comprising:

a storage capacitor coupled between the gate electrode of the second transistor and the first power source; and a fourth transistor coupled between the second transistor and the OLED, and configured to be turned off when the emission control signal of the emission control signals is supplied to the $i^{th}$ emission control line of the emission control lines, wherein a second electrode of the second transistor is coupled to a gate electrode of the first transistor.

18. The organic light emitting display as claimed in claim 16, further comprising:

the first transistor further comprising a second electrode coupled to the first electrode of the second transistor;

a fourth transistor coupled between the second electrode of the second transistor and the OLED, and configured to be turned off when the emission control signal of the emission control signals is supplied to the $i^{th}$ emission control line of the emission control lines;

a fifth transistor coupled between the second electrode of the second transistor and the gate electrode of the second transistor, and configured to be turned on when the scan signal of the scan signals is supplied to the $i^{th}$ scan line of the scan lines; and a storage capacitor coupled between the gate electrode of the second transistor and the first power source, wherein the sixth transistor is configured to be turned off at a point in time when the fourth transistor is turned off.

19. The organic light emitting display as claimed in claim 18, wherein the sixth transistor is configured to be turned off when an $(i+1)^{th}$ emission control signal of the emission control signals is supplied to an $(i+1)^{th}$ emission control line of the emission control lines.

20. The organic light emitting display as claimed in claim 18, wherein the sixth transistor is configured to be turned on when the first transistor is turned off, and to be turned off when the first transistor is turned on.

21. The organic light emitting display as claimed in claim 18, wherein a voltage of the bias power source is lower than a voltage of a data signal of the data signals supplied to the data line of the data lines.

22. The organic light emitting display as claimed in claim 18, wherein a voltage of the bias power source is equal to or higher than a voltage equal to a difference between a threshold voltage of the second transistor and a voltage of the first power source.

23. The organic light emitting display as claimed in claim 22, further comprising a seventh transistor configured to be turned on when an $(i-1)^{th}$ scan signal of the scan signals is supplied to an $(i-1)^{th}$ scan line of the scan lines, and coupled between the gate electrode of the second transistor and a second bias power source having a voltage that is lower than a voltage of a data signal of the data signals supplied from the data line of the data lines.

24. The organic light emitting display as claimed in claim 12, wherein a width of the reset signal of the reset signals is equal to or larger than a width of the scan signal of the scan signals.

* * * * *

UNITED STATES PATENT AND TRADEMARK OFFICE

CERTIFICATE OF CORRECTION

PATENT NO. : 8,692,821 B2
APPLICATION NO. : 13/013716
DATED : April 8, 2014
INVENTOR(S) : Seong-Il Park It is certified that error appears in the above-identified patent and that said Letters Patent is hereby corrected as shown below:

In the Claims

Column 12, Claim 5, line 37 After "between"

Insert -- a --

Signed and Sealed this
Twelfth Day of January, 2016

Michelle K. Lee

*Director of the United States Patent and Trademark Office*